(12) United States Patent
Eger et al.

(10) Patent No.: US 9,566,872 B2
(45) Date of Patent: Feb. 14, 2017

(54) CONTACTLESS CHARGING OF AN ELECTRICAL ENERGY STORE OF A MOTOR VEHICLE

(71) Applicant: Dr. Ing. h.c. F. Porsche Aktiengesellschaft, Stuttgart (DE)

(72) Inventors: Ulrich Eger, Zaberfeld (DE); Wolfgang Herdeg, Rutesheim (DE); Stefan Schmitz, Markgroeningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 131 days.

(21) Appl. No.: 14/224,580

(22) Filed: Mar. 25, 2014

(65) Prior Publication Data

US 2014/0292266 A1    Oct. 2, 2014

(30) Foreign Application Priority Data

Mar. 27, 2013   (DE) .................. 10 2013 103 157

(51) Int. Cl.
*H02J 7/00* (2006.01)
*B60L 11/18* (2006.01)
*B60L 11/14* (2006.01)

(52) U.S. Cl.
CPC .............. *B60L 11/182* (2013.01); *B60L 11/14* (2013.01); *B60L 11/1805* (2013.01); *B60L 11/1824* (2013.01); *B60L 11/1833* (2013.01); *B60L 2270/147* (2013.01); *Y02T 10/70* (2013.01); *Y02T 10/7005* (2013.01); *Y02T 10/7072* (2013.01); *Y02T 10/7077* (2013.01); *Y02T 90/12* (2013.01); *Y02T 90/121* (2013.01);
(Continued)

(58) Field of Classification Search
CPC ............. H02J 7/025; H02J 5/005; H02J 50/90
USPC .......................................... 320/108
See application file for complete search history.

(56) References Cited

U.S. PATENT DOCUMENTS

| 5,573,090 A | * | 11/1996 | Ross | ............................... 191/10 |
| 6,421,600 B1 | * | 7/2002 | Ross | ............................ 701/117 |
| 2007/0131505 A1 | * | 6/2007 | Kim | ............................... 191/14 |

(Continued)

FOREIGN PATENT DOCUMENTS

| DE | 10 2010 028 126 | 10/2011 |
| DE | 10 2010 055 369 | 6/2012 |

(Continued)

OTHER PUBLICATIONS

Korean Patent Appl. No. 10-2014-0034052—Notice of Preliminary Rejection.
(Continued)

*Primary Examiner* — Suchin Parihar
(74) *Attorney, Agent, or Firm* — Gerald E. Hespos; Michael J. Porco; Matthew T. Hespos

(57) ABSTRACT

The invention relates to a charging apparatus for contactless charging of an electrical energy store (2) of a motor vehicle (1), comprising a primary unit (13) which is arranged outside the motor vehicle (1) and comprising a vehicle-mounted secondary unit (14). In order to simplify contactless charging of a motor vehicle comprising an electrical energy store, the vehicle-mounted secondary unit (14) can be moved relative to the primary unit (13), which is arranged outside the motor vehicle (1), in order to reduce the size of an air gap or distance (16) between the primary unit (13) and the secondary unit (14).

7 Claims, 2 Drawing Sheets

(52) U.S. Cl.
CPC ............ *Y02T 90/122* (2013.01); *Y02T 90/125* (2013.01); *Y02T 90/14* (2013.01)

(56) References Cited

U.S. PATENT DOCUMENTS

| | | |
|---|---|---|
| 2009/0040029 A1* | 2/2009 | Bridges et al. .......... 340/310.11 |
| 2009/0096413 A1* | 4/2009 | Partovi et al. ................ 320/108 |
| 2011/0181240 A1* | 7/2011 | Baarman et al. ............. 320/108 |
| 2011/0285349 A1* | 11/2011 | Widmer et al. ............... 320/108 |
| 2012/0249063 A1* | 10/2012 | Holmes et al. ............... 320/108 |
| 2013/0049683 A1* | 2/2013 | Farkas .......................... 320/108 |
| 2013/0257373 A1* | 10/2013 | Mallon et al. ................ 320/109 |
| 2013/0307477 A1 | 11/2013 | Reinschke |
| 2014/0111155 A1* | 4/2014 | Bendicks ...................... 320/108 |
| 2014/0232336 A1* | 8/2014 | Kepka .......................... 320/108 |
| 2015/0102685 A1* | 4/2015 | Blood et al. .................. 307/104 |
| 2015/0224882 A1* | 8/2015 | Brill et al. .................... 320/108 |
| 2015/0279555 A1* | 10/2015 | Chiyo et al. .................. 320/108 |
| 2015/0279556 A1* | 10/2015 | Chiyo et al. .................. 320/108 |

FOREIGN PATENT DOCUMENTS

| | | |
|---|---|---|
| DE | 10 2011 003 436 | 8/2012 |
| DE | 10 2011 089 339 | 6/2013 |
| JP | 07-039007 | 2/1995 |
| JP | 09-247803 | 9/1997 |
| JP | 2000-152512 | 5/2000 |
| JP | 2010183804 | 8/2010 |
| KR | 20-1999-012762 | 4/1999 |
| KR | 101013869 | 2/2011 |

OTHER PUBLICATIONS

German Search Report of Jan. 13, 2014.
Korean Notice of Preliminary Rejection for KR 10-2014-0034052.

* cited by examiner

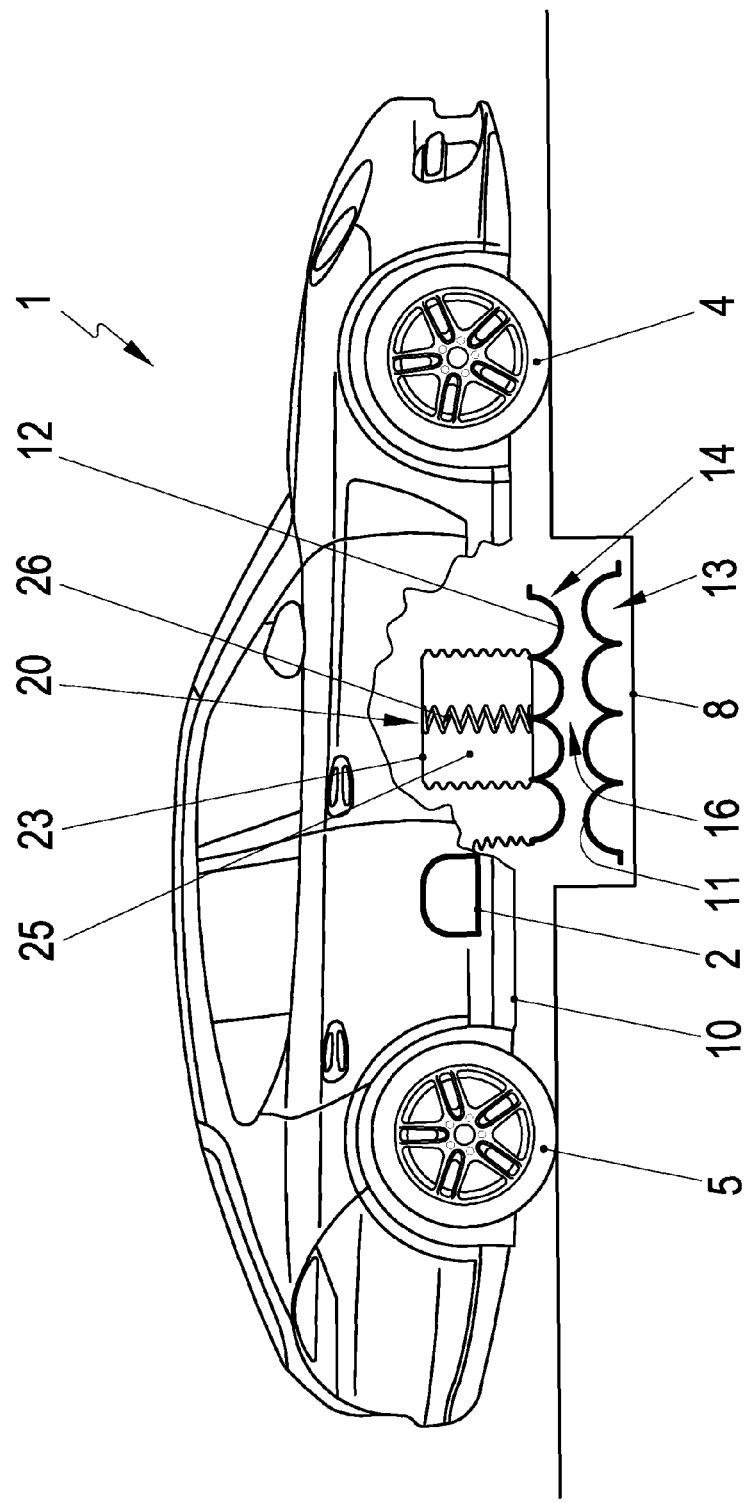

CONTACTLESS CHARGING OF AN ELECTRICAL ENERGY STORE OF A MOTOR VEHICLE

CROSS REFERENCE TO RELATED APPLICATION

This application claims priority under 35 USC 119 to German Patent Appl. No. 10 2013 103 157.9 filed on Mar. 27, 2013, the entire disclosure of which is incorporated herein by reference.

BACKGROUND

1. Field of the Invention

The invention relates to an apparatus for contactless charging of an electrical energy store of a motor vehicle. The apparatus has a primary unit outside the motor vehicle and a secondary unit mounted in the vehicle. The invention also relates to a motor vehicle comprising an electrical energy store and a vehicle-mounted secondary unit that cooperates with a primary unit outside the motor vehicle. The invention further relates to a method for contactless charging of an electrical energy store of a motor vehicle.

2. Description of the Related Art

An electric vehicle or a hybrid vehicle has an electric motor that is supplied with electrical energy by an electrical energy store. The electrical energy store can be charged with the aid of a charging apparatus, as is disclosed, for example, in Japanese publication JP 2000-152512. German laid-open specification DE 10 20011 003 436 A1 discloses a charging column that can be connected to an electric vehicle by a charging cable for charging the electric vehicle. The charging column can be retracted and extended in relation to a hollow space.

The object of the invention is to simplify contactless charging of a motor vehicle that has an electrical energy store.

SUMMARY OF THE INVENTION

A charging apparatus for contactless charging of an electrical energy store of a motor vehicle has a primary unit arranged outside the motor vehicle and a vehicle-mounted secondary unit. The vehicle-mounted secondary unit can be moved relative to the primary unit to reduce the size of an air gap or distance between the primary unit and the secondary unit. The primary unit cooperates with the secondary unit for inductively performing contactless charging of the vehicle-mounted electrical energy store. Inductive is intended to encompass resonant inductive. The primary unit and the secondary unit each preferably comprise at least one electrical coil, which constitutes an inductive component, and optionally a capacitor or a capacitive component for forming a resonant circuit. The motor vehicle preferably is an electric vehicle or a hybrid vehicle with an electric motor that is supplied with electrical energy from the electrical energy store. The electrical energy store of the motor vehicle preferably is a traction battery. The primary unit preferably is installed permanently and preferably is connected to a stationary power supply system. The primary unit and the secondary unit each further preferably comprise a power electronics system. The secondary unit is arranged in the vicinity of the primary unit by suitably arranging the motor vehicle in relation to the primary unit. The primary unit and the secondary unit form a transformer when the secondary unit is arranged close enough to the primary unit. An air gap of the transformer is defined by the distance between the primary unit and the secondary unit. When the air gap is sufficiently small, electrical energy can be transferred from the stationary power supply system, via the primary unit and the secondary unit, to the electrical energy store of the motor vehicle in a (resonant) inductive manner. The size of the air gap between the primary unit and the secondary unit can be minimized in a simple manner by moving the vehicle-mounted secondary unit relative to the primary unit, which is arranged outside the motor vehicle. This has a positive effect on the degree of efficiency of the inductive energy transfer.

The vehicle preferably has a lowering device that can move the vehicle-mounted secondary unit toward the primary unit outside the motor vehicle. Lowering the vehicle-mounted secondary unit provides surprising advantages over raising the primary unit relative to the vehicle-mounted secondary unit. When raising the primary unit, positioning of the primary unit relative to the secondary unit has proven critical in respect of fault currents, which are in the form of eddy currents, due to metal parts in the underbody region of the motor vehicle that have an unfavorable effect on the degree of efficiency during (resonant) inductive energy transfer. Therefore, positioning has to be very accurate, and apparatus for making accurate positioning is very expensive.

The vehicle-mounted lowering device may comprise a fluid power device. The fluid power device may comprise, for example, at least one fluid cylinder, such as a hydraulic cylinder to lower the secondary unit.

The vehicle-mounted lowering device may comprise a pneumatic device. The pneumatic device with at least one pneumatic cylinder and/or one pneumatic chamber has proven particularly advantageous.

The vehicle-mounted lowering device may comprise an inflatable air chamber arranged, designed and coupled so that a secondary coil of the vehicle-mounted secondary unit is moved toward a primary coil of the primary unit when the air chamber is inflated. The inflatable air chamber advantageously is of low weight. Undesired secondary currents or fault currents that occur when raising the primary unit do not occur when the vehicle-mounted lowering device is used since there are no secondary metal parts in the vicinity of the primary unit.

The vehicle-mounted lowering device may comprise a prestressing device that prestresses the vehicle-mounted secondary unit into an inoperative position. Thus, the vehicle-mounted secondary unit advantageously can be moved back into its inoperative position simply by discharging air from the inflated air chamber. The return movement of the vehicle-mounted secondary unit then is produced in a simple manner by the prestressing device, without additional energy being required.

The prestressing device may comprise a spring device. The spring device may be a helical spring, in particular a helical tension spring arranged in the inflatable air chamber.

The vehicle-mounted secondary unit preferably is arranged in an underbody region of the motor vehicle.

The primary unit, which is arranged outside the motor vehicle, preferably is in or on a floor where the motor vehicle is parked. The primary unit is arranged, for example, in or on the floor of a parking area or garage area.

The invention further relates to a lowering device, a primary unit and/or a secondary unit for the above-described charging apparatus. These components can be sold separately.

The invention further relates to a motor vehicle comprising an electrical energy store and a vehicle-mounted secondary unit that can be moved relative to a primary unit that is arranged outside the motor vehicle. Movement of the secondary unit reduces the size of an air gap or distance between the primary unit and the secondary unit. The motor vehicle preferably is an electric vehicle or hybrid vehicle.

The invention also relates to a method for contactless charging of an electrical energy store of a motor vehicle. The method includes arranging a primary unit of charging apparatus outside the motor vehicle. The method then includes moving a vehicle-mounted secondary unit relative to the primary unit to reduce the size of an air gap or distance between the primary unit and the secondary unit. The transfer of energy from the primary unit to the secondary unit can be optimized by minimizing the air gap between the primary unit and the secondary unit in line with the invention.

Further features of the invention can be gathered from the following description which describes an exemplary embodiment with reference to the drawings.

BRIEF DESCRIPTION OF THE DRAWINGS

FIG. 2 shows the motor vehicle of FIG. 1 with the vehicle-mounted secondary unit in a lowered position.

DETAILED DESCRIPTION OF THE PREFERRED EMBODIMENTS

Figure 1:
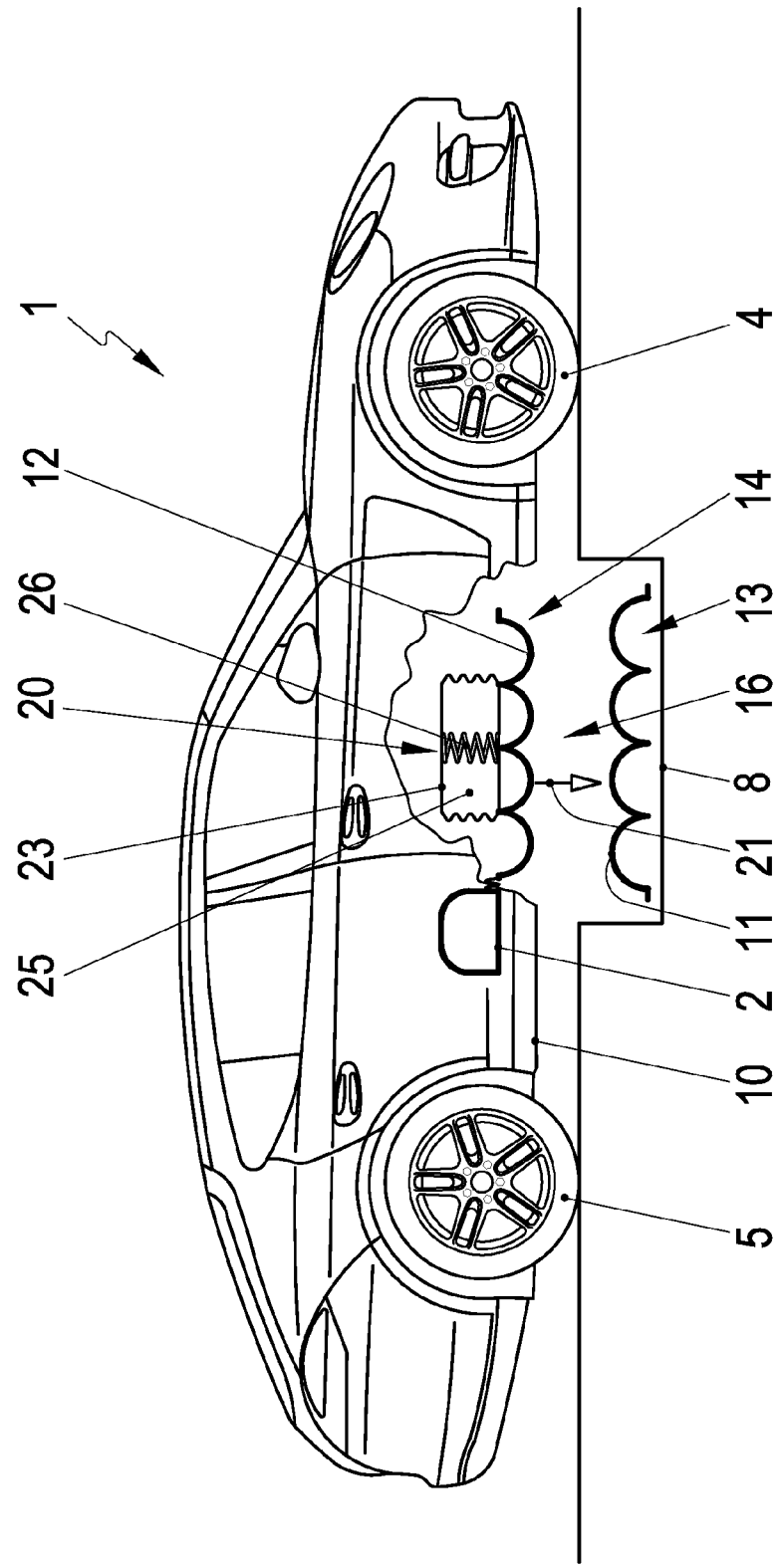
FIG. 1 is a simplified illustration of a motor vehicle with a charging apparatus wherein a vehicle-mounted secondary unit is in its inoperative position.

FIGS. 1 and 2 show a side view of a motor vehicle 1. The motor vehicle 1 is an electric vehicle or a hybrid vehicle comprising an electric motor that is supplied with energy from an electrical energy storage device 2. The electrical energy storage device 2 is arranged in an underbody region between front wheels 4 and rear wheels 5 of the motor vehicle 1. The motor vehicle 1 stands on a floor 8 by way of the front wheels 4 and the rear wheels 5. The floor 8 is, for example, the floor of a garage for the motor vehicle 1. A first coil 11 is embedded in the floor 8.

The motor vehicle 1 comprises a second coil 12 in an underbody region 10 between the front wheels 4 and the rear wheels 5. The second coil 12 is connected to the electrical energy storage device 2 and is arranged above the first coil 11.

The first coil 11 is a primary unit 13 arranged outside the motor vehicle 1. The second coil 12 is a vehicle-mounted secondary unit 14.

The two coils 11, 12 or units 13, 14 are designed and arranged so that electrical energy can be transferred in a (resonant) inductive, contact-free manner from the first coil 11 to the second coil 12 for electrically charging the electrical energy storage device 2 in the motor vehicle 1. A physical connection between the coils 11, 12 is not required.

The contact-free or contactless transfer of the electrical energy between the coils 11 and 12 has the advantage that any plug connections can be dispensed with. An air gap or distance 16 between the two coils 11 and 12 should be minimized to ensure a good degree of efficiency when transferring the electrical energy between the coils 11 and 12 in a contactless manner.

To this end, a lowering device 20 is integrated in the motor vehicle 1 and enables the vehicle-mounted secondary unit 14, including the secondary or second coil 12, to be lowered in the manner indicated by the arrow in FIG. 1.

The lowering device 20 enables the secondary unit 14 or the secondary coil 12 to be moved toward the first or primary coil 11 to minimize the air gap or distance 16 between the two coils 11, 12. FIG. 1 illustrates the lowering device 20 comprising the vehicle-mounted secondary unit 14 in an inoperative position.

An opening for lowering the secondary unit 14 in the underbody region 10 of the motor vehicle 1 advantageously is closed by a suitable cover In the inoperative position of the vehicle-mounted secondary unit 14. The cover (not illustrated) can be guided in a movable manner in the underbody region 10 of the motor vehicle 1.

In a closed position of the cover, the opening in the underbody region 10 of the motor vehicle 1 is closed. FIGS. 1 and 2 illustrate the opening in the underbody region 10 of the motor vehicle 1 in the open state.

The lowering device 20 is illustrated in a simplified manner in the form of a partial section in FIGS. 1 and 2. The lowering device 20 is designed as a fluid power, in particular pneumatic, device 23 with an inflatable air chamber 25.

The inflatable air chamber 25 is illustrated in an inactive state in FIG. 1. The air chamber 25 is inflated in FIG. 2 to move the secondary unit 14 toward the primary unit 13 so that the air gap or distance 16 between the primary and secondary units 13 and the secondary unit 14 is minimized.

The lowering device 20 further comprises a prestressing device 26 with a prestressed spring device arranged or clamped in the inflatable air chamber 25.

The spring device is prestressed in the inflatable air chamber 25 so that the secondary unit 14 is returned automatically from its charging position, as illustrated in FIG. 2, to its inoperative position, as illustrated in FIG. 1, due to the prestressing force of the prestressing device 26. It is only necessary to open an air-discharge opening in the inflatable air chamber 25 for this purpose. As a result, no additional energy is required to return the secondary unit 14 to its inoperative position.

What is claimed is:

1. A charging apparatus for contactless charging of an electrical energy store of a motor vehicle, comprising:
    a primary unit arranged outside the motor vehicle;
    an inflatable chamber mounted on an underside of the motor vehicle and being inflatable from a first volume to a second volume that is larger than the first volume, the inflatable chamber having a wall that moves down when the inflatable chamber is inflated to the second volume;
    a vehicle-mounted secondary unit mounted at the wall of the inflatable chamber and moving down with the wall when the inflatable chamber is inflated, the secondary unit being configured to receive electrical energy from the primary unit; and
    a spring device arranged in the inflatable chamber and having a lower end attached to the wall and an upper end attached in the inflatable chamber above the wall, the spring device being stressed and expanded when the inflatable chamber is inflated so that the lower end of the spring device moves down with the wall, the spring device returning to an unstressed and unexpanded shape when the inflatable chamber is deflated, thereby returning the lower wall and the vehicle-mounted secondary unit up to an inoperative position spaced from the primary unit.

2. The charging apparatus of claim 1, wherein the vehicle-mounted lowering device comprises a fluid power device.

3. The charging apparatus of claim 1, wherein the vehicle-mounted lowering device comprises a pneumatic device.

4. The charging apparatus of claim 1, wherein the vehicle-mounted secondary unit is arranged in an underbody region of the motor vehicle.

5. The charging apparatus of claim 1, wherein the primary unit is arranged in or on a floor on which the motor vehicle can be parked.

6. A motor vehicle having an electrical energy store configured to be charged from an external charging apparatus in a contact free manner, the motor vehicle comprising:
- a vehicle-mounted unit for receiving a charge from the external charging apparatus; and
- a lowering device selectively operable between a first position in which the vehicle-mounted unit is in an inoperative position and a second position in which the vehicle-mounted unit is moved toward the external charging apparatus and into an operative position, the lowering device including an inflatable chamber having a first internal volume when the lowering device is in the first position, the inflatable chamber being inflated to have a second internal volume larger than the first internal volume when the lowering device is in the second position to move the vehicle-mounted unit into the operative position; and
- a spring device arranged in the inflatable chamber, the spring device being stressed and expanded when the vehicle-mounted unit is in the second position and the chamber is inflated and resiliently returning to an unstressed and unexpanded shape when the inflatable chamber is deflated, thereby returning the vehicle-mounted unit to the inoperative position.

7. A method for contactless charging of an electrical energy store of a motor vehicle, comprising:
- providing a primary charging unit in a surface on which the motor vehicle is supported;
- providing an inflatable chamber at an underside of the motor vehicle, the inflatable chamber having a lower wall, a secondary charging unit on the lower wall and a spring device in the inflatable chamber, the spring device having a lower end attached to the lower wall;
- positioning the motor vehicle so that the primary charging unit is substantially aligned with the secondary charging unit;
- inflating the inflatable chamber so that the lower wall and the secondary charging unit move toward the primary charging unit and into an operative position and to reduce a size of an air gap or distance between the primary and secondary charging units, while stressing the spring device;
- operating the primary charging unit to charge the secondary charging unit; and
- deflating the inflatable chamber, thereby removing stress on the spring device and permitting the spring device to returning lower wall and the secondary charging unit to an elevated inoperative position.

* * * * *